United States Patent [19]

Iguchi

[11] 4,112,443
[45] Sep. 5, 1978

[54] SHUTTER AND LOW-LIGHT INDICATOR ACTUATING DEVICE FOR A CAMERA

[75] Inventor: Susumi Iguchi, Tokyo, Japan

[73] Assignee: Ricoh Co., Ltd., Tokyo, Japan

[21] Appl. No.: 760,889

[22] Filed: Jan. 21, 1977

[30] Foreign Application Priority Data

Jan. 26, 1976 [JP] Japan .................................. 51-7658
Jan. 27, 1976 [JP] Japan .................................. 51-8190
Jan. 27, 1976 [JP] Japan .............................. 51-8492[U]

[51] Int. Cl.² .............................................. G03B 7/08
[52] U.S. Cl. ...................................... 354/31; 354/51; 354/60 L
[58] Field of Search .............. 354/50, 51, 60 R, 60 E, 354/60 L, 31; 356/226

[56] References Cited

U.S. PATENT DOCUMENTS

| | | |
|---|---|---|
| 3,664,245 | 5/1972 | Bresson et al. ................ 354/60 L X |
| 4,027,314 | 5/1977 | Iguchi et al. .................... 354/60 L X |

*Primary Examiner*—Michael L. Gellner
*Attorney, Agent, or Firm*—Frank J. Jordan

[57] ABSTRACT

Voltage comparators for actuating a camera shutter and a low-light indicating lamp respectively have inputs connected to junctions of photocells and resistors so as to be controlled in response to sensed light level. The voltage comparator for the low-light indicator energizes the indicator lamp when the light level is below a low-light value from the time the shutter release button is partially depressed until the time the shutter is closed after the exposure. The voltage comparator for the shutter produces a shutter opening signal to open the shutter for the required length of time based on the light level. The output of the voltage comparator for the shutter is connected to a stroke input of the voltage comparator for the low-light indicator so that the low light indicator is de-energized when the shutter is closed.

4 Claims, 5 Drawing Figures

SHUTTER AND LOW-LIGHT INDICATOR ACTUATING DEVICE FOR A CAMERA

BACKGROUND OF THE INVENTION

The present invention relates to a shutter and low-light indicator actuating device for a camera.

In electronic cameras, it is desirable to provide a low-light indicator lamp which is energized when the incident light is below a certain value, the lens aperture is fully open and the computed shutter opening time is long enough that there is danger of blurring the picture by moving the camera when the camera is hand-held. It is further desirable to maintain the lamp on until the exposure is completed, especially with exposures of over one second. Various devices comprising switches have been devised to perform this function. However, switches are bulky and are not compatible with the miniaturization of electronic cameras. Furthermore, switches are subject to mechanical failures such as caused by increased contact resistance resulting from prolonged use.

A device has been proposed for use in the KODAK INSTAMATIC 60 (trade name) camera in which an input for a Schmitt trigger for controlling a low-light indicator lamp is connected to a battery terminal through another Schmitt trigger which is used for actuating the shutter so that the lamp is lighted while the shutter is open. Whereas this device is generally effective, it suffers from a serious drawback in that the internal resistance of the Schmitt trigger for the shutter varies in dependence on ambient conditions such as temperature, humidity and the like to such a degree that the operation of the Schmitt trigger for the indicator bulb is erratic, especially under low-light conditions when the operation must be exact.

More specifically, the Schmitt trigger for the shutter comprises an output transistor, the input of the Schmitt trigger for the low-light indicator being connected to the collector of this output transistor. The Schmitt trigger for the low indicator is enabled when the Schmitt trigger for the shutter produces a low output, or when the output transistor is in saturation. This low output is used as a ground reference for the low-light sensing function.

However, a small variation in the resistance of the output transistor when operated in saturation, which is within the normal manufacturing tolerances of such transistors even when fabricated as integrated circuits, will cause a considerable variation in the light level at which the low-light indicator is activated. Other conditions which can considerably change this level are the voltage drop across a battery used to power the device which normally occurs with use and variations in temperature and humidity.

An attempt to overcome this effect has been proposed which involves using the output transistor collector voltage of the Schmitt trigger for the shutter as a ground reference for both the low-light sensing function and also for the power supply of the Schmitt trigger for the low-light indicator. Whereas this is a partial solution to the problem due to the compensating effect of having any battery voltage variations applied equally to the sensing and power supply functions of the Schmitt trigger for the low-light indicator, in a practical circuit the low-light indicator lamp, which is most advantageously provided in the form of a light-emitting diode (LED), is connected in series with its current limiting resistor in parallel with the light sensing circuitry of the Schmitt trigger for the low-light indicator.

The LED tends to act as a constant voltage device, with the result that the voltage drops across the output transistor and the current limiting resistor vary non-linearly as the battery voltage decreases. This produces a non-linear variation of the low-light indicator activation level. The effect is reduced by making the value of the current limiting resistor very high compared to the internal resistance of the LED. However, yet another undesirable effect is introduced thereby in that the LED current and brightness are severely reduced and the rate of decrease in brightness of the LED is greater than the rate of decrease of the battery voltage. For these reasons, the expedients described above do not overcome the problem and said problem has remained heretofore unsolved.

SUMMARY OF THE INVENTION

It is therefore an important object of the present invention to provide a shutter and low-light indicator actuating device which overcomes the drawbacks of the prior art by connecting an actuator means for an indicator light to a power source through a path which does not include a Schmitt trigger or equivalent device.

It is another important object of the present invention to provide a shutter and low-light indicator actuating device in which the output of a voltage comparator utilized to actuate a camera shutter is connected to a stroke input of a voltage comparator utilized to actuate a low-light indicator lamp.

It is another object of the present invention to provide a generally improved shutter and low-light indicator actuating device for a camera.

Other objects, together with the foregoing, are attained in the embodiments described in the following description and illustrated in the accompanying drawing.

DESCRIPTION OF THE PREFERRED EMBODIMENTS

While the shutter and low-light indicator actuating device of the invention is susceptible of numerous physical embodiments, depending upon the environment and requirements of use, substantial numbers of the herein shown and described embodiments have been made, tested and used, and all have performed in an eminently satisfactory manner.

Figure 1:
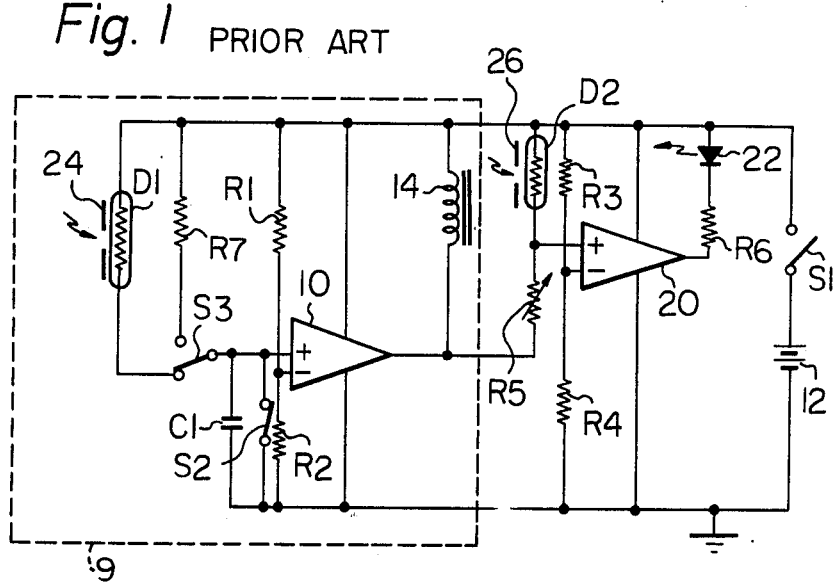
FIG. 1 is an electrical schematic diagram of a prior art shutter and low-light indicator actuating device similar to that incorporated in the KODAK INSTAMATIC 60 camera.

Referring now to FIG. 1, a prior art shutter and low-light indicator actuating device similar to that utilized in the KODAK INSTAMATIC 60 (trade name) camera comprises a Schmitt trigger type voltage comparator 10 which are acts as a camera shutter actuating means and has an output connected to a positive terminal of a battery 12 through a shutter solenoid 14 and a switch S1. The voltage comparator 10 also has supply inputs (no numerals) connected to the positive and negative terminals of the battery 12 in series with the switch S1. An inverting input of the voltage comparator 10 is connected to the junctions of resistors R1 and R2 which are connected in series with the switch S1 to the battery 12. The series combination of a photosensitive resistance element such as a photoconductive diode D1 and a capacitor C1 is connected in parallel with the series combination of the resistors R1 and R2, with the junction of the diode D1 and the capacitor C1 being connected to a non-inverting input of the voltage comparator 10. A switch S2 is connected in parallel with the capacitor C1. A Schmitt trigger voltage comparator 20 which serves as an actuator means for a low-light indicator lamp in the form of an LED 22 has source inputs (no numerals) connected to the source inputs of the voltage comparator 10. The LED 22 is connected between an output of the voltage comparator 20 and the switch S1 through a current limiting resistor R6. Resistors R3 and R4 are connected in a series combination which is further connected in parallel with the series combination of the resistors R1 and R2. The junction of the resistors R3 and R4 is connected to an inverting input of the voltage comparator 20. A photoconductive diode D2 is connected between a non-inverting input of the voltage comparator 20 and the switch S1. A variable resistor R5 is connected between the non-inverting input of the voltage comparator 20 and the output of the voltage comparator 10.

The resistors R1 and R2 constitute a voltage divider for the inverting input of the voltage comparator 10 so that a predetermined voltage is constantly applied thereto. The voltage comparator 10 is so arranged as to produce a positive output voltage or shutter closing voltage when the voltage at the non-inverting input thereof is higher (mode positive) than the voltage at the non-inverting input thereof. The voltage comparator 20 and the resistors R3 and R4 are connected in the same arrangement as the voltage comparator 10 and resistors R1 and R2 except that the values of the resistors are different. The photoconductive diodes D1 and D2 are arranged so that the resistances thereof decrease as the light incident thereon increases so that the voltages at the non-inverting input of the voltage comparators 10 and 20 increase as the sensed light level increases.

The switch S1 is connected to a shutter release button of the camera (not shown) so that the switch S1 is closed when the shutter release button is partially pressed. The switch S2 is normally closed and adapted to be opened as will be described below.

Also shown in FIG. 1 are diaphragms 24 and 26 provided to the photoconductive diodes D1 and D2 respectively, which compensate for the speed of the film loaded into the camera. In addition, a switch S3 is provided to selectively connect the non-inverting input of the voltage comparator 10 to the positive terminal of the battery 12 through a fixed resistor R7 for flash photography. The switch S3 normally connects the voltage comparator 10 to the photoconductive diode D1 and is automatically changed to connect the voltage comparator 10 to the resistor R7 when a flash unit is attached to the camera. The resistor R7 provides a shutter opening of fixed duration such as 1/30 sec for flash photography. The resistor R5 is made variable to adjust the low-light indicator activation level to the desired value.

In operation, the photographer aims the camera at the scene he wishes to photograph so that the light from the scene is incident on the photoconductive diodes D1 and D2, the resistance of which varies depending on the incident light level. The photographer then partially depresses the shutter release button thereby closing the switch S1 and connecting the battery 12 to the device. Since the switch S2 is closed, the capacitor C1 is shorted out and the voltage at the non-inverting input of the voltage comparator 10 is equal to the battery 12 negative terminal voltage, which may be considered as ground for simplicity of description as indicated in FIG. 1. Since the voltage at the non-inverting terminal of the voltage comparator 10 is lower than the voltage at the inverting terminal thereof, the voltage comparator 10 produces a low output or shutter opening voltage which is substantially equal to ground. The photoconductive diode D2 and the resistor R5 are effectively connected in series between the positive and negative terminals of the battery 12 through the switch S1 and the voltage comparator 10 since the output voltage of the voltage comparator 10 is substantially equal to ground. The values of the resistors R3 and R4 are selected so that the voltage at their junction is a predetermined low-light voltage corresponding to the minimum light level at which the camera can be safely hand-held. If the incident light is above this level, the resistance of the photoconductive diode D2 will be low so that the voltage at the non-inverting input of the voltage comparator 20 will be higher (more positive) than the low-light voltage at the inverting terminal thereof. The voltage comparator 20 will produce a high output voltage which is substantially equal to the voltage at the positive terminal of the battery 12 so that the LED 22 will have substantially no voltage difference thereacross and will not be lighted. On the other hand, if the incident light is below the low-light level, the resistance of the photoconductive diode D2 will be high so that the voltage at the non-inverting input of the voltage comparator 20 will be lower than the voltage at the inverting input thereof so that the voltage comparator 20 will produce a low output of indicator actuating voltage which will activate the LED 22 and inform the photographer that he should either place the camera on a tripod or similar solid support or use a flash.

Although the camera shutter is not shown, it may be a known focal plane type which comprises two curtains; a first curtain which is biased toward on open position and is latched closed when the shutter is cocked and a second curtain which is biased toward a closed position and may be opened by the solenoid 14.

When the photographer presses the shutter release button partially to close the switch S1, the voltage comparator 10 produces the low shutter opening voltage as described above to energize the solenoid 14 and open the second curtain of the shutter. However, the first curtain is closed and the film will not be exposed. When the shutter release button is pressed further, the first curtain is mechanically tripped and released to move toward its open position. When the first curtain reaches the open position, it is arranged to open the switch S2. This allows the capacitor C1 to charge through the photoconductive diode D1 at a rate which is dependent on the resistance of the photoconductive diode D1 and therefore on the incident light level. If the light level is high the resistance of the photoconductive diode D1 will be low and the capacitor C1 will charge quickly, and vice-versa. When the voltage across the capacitor C1, which appears at the non-inverting input of the voltage comparator 10 reaches the voltage at the inverting input thereof, the voltage comparator 10 will produce a high voltage or shutter closing voltage which is substantially equal to the voltage at the positive terminal of the battery 12. This will cause the solenoid 14 to be de-energized and release the second curtain of the shutter to return to its closed position, thereby terminating the exposure of the film. Subsequent cocking of the shutter will cause the first curtain to be latched open and the switch S2 to close. The film, however, will not be exposed since the second curtain is closed.

It will be seen that the photoconductive diode D1 and the capacitor C1 constitute a variable integrator, and that the time required for the voltage at the non-inverting input of the voltage comparator 10 to reach the voltage at the inverting input thereof is a predetermined function of the incident light level. The shutter opening time is thereby controlled in accordance with the incident light level.

When the voltage comparator 10 produces a high output to terminate the exposure, this high voltage is also applied to the input of the voltage comparator 20. This voltage is arranged to be greater than the low-light voltage at the inverting input of the voltage comparator 20, and the voltage comparator 20 will produce a high output voltage which will de-actuate the LED 22 indicating that the exposure is completed.

Figure 2:
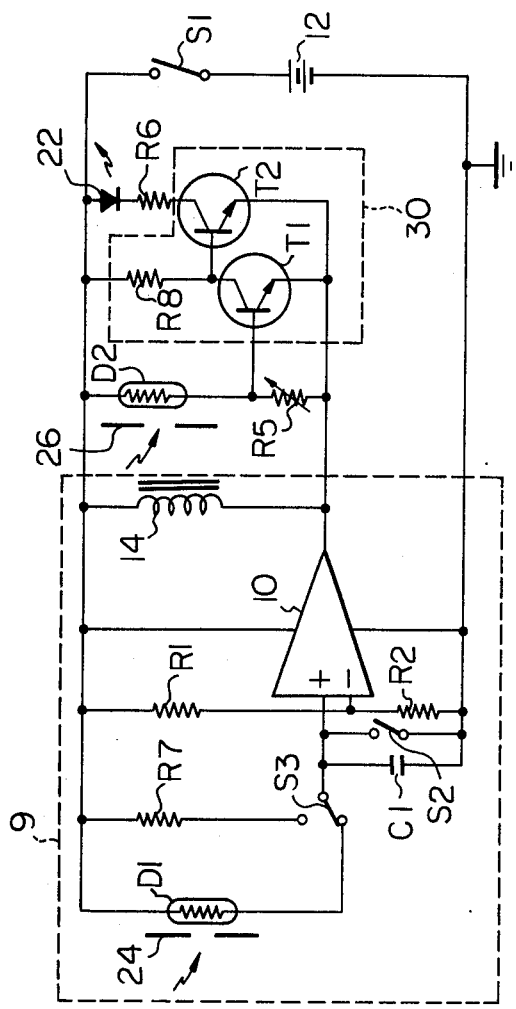
FIG. 2 shows another prior art shutter and low-light indicator actuating device which constitutes an improvement to the device of FIG. 1.

The above described device suffers from the serious drawback that the non-inverting input of the voltage comparator 20 is connected to ground through the collector circuit of the output transistor (not shown) of the voltage comparator 10 when the second curtain of the shutter is held open by the solenoid 14. Especially at low light levels at which the operation of the low-light indicator is especially critical, variations in ambient conditions such as temperature and humidity cause the output impedance of the voltage comparator 10 to be unstable to the extent that the operation of the low-light indicator become inaccurate. FIG. 2 shows a prior art modification of the device shown in FIG. 1, in which like elements are designated by the same reference numerals. The circuit comprising the voltage comparator 10 constitutes a shutter actuator unit 9 which includes the elements enclosed within a corresponding broken line rectangle in the drawing. The same shutter actuator unit 9 is utilized in the embodiments of the present invention as will be described in detail below.

Referring now to FIG. 2, the photoconductive diode D2 and the resistor R5 are connected between the output of the voltage comparator 10 and the switch S1 as in the prior art device shown in FIG. 1. However, the voltage comparator 20 is replaced by a voltage comparator 30 comprising discrete transistors. More specifically, the junction of the diode D2 and resistor R5 is connected to the base of an NPN transistor T1, the emitter of which is connected to the output of the voltage comparator 10. The collector of the transistor T1 is connected to the switch S1 through a resistor R8. The collector of the transistor T1 is also connected to the base of an NPN transistor T2, the emitter of which is connected to the output of the voltage comparator 10 and the collector of which is connected to the current limiting resistor R6 for the LED 22.

The transistor T1 is biased to be turned on when the voltage at the base thereof is above the low-light level and turned off when the voltage at the base thereof is below the low-light level. When the transistor T1 is turned on, it effectively connects the base of the transistor T2 to the emitter thereof so that the transistor T2 is turned off regardless of the emitter voltage. With the transistor T2 turned off, no current may flow through the LED 22, so that the LED 22 will not be lit. However, when the sensed light is below the low-light level, the transistor T1 will be turned off, and the base of the transistor T2 will be connected to the switch S1 through the resistor R8. When the output of the voltage comparator 10 is low (the second curtain is open), this low voltage applied to the emitter of the transistor T2 will cause the same to be forward biased and turned on, thereby allowing current flow through the LED 22 to light the same. When the second curtain closes and the output of the voltage comparator 10 goes high, the transistor T2 will be turned off, thereby extinguishing the LED 22.

The circuit of FIG. 2 effectively connects the ground reference points of the light sensing circuitry constituted by the diode D2 and resistor R5 and the emitters of the transistors T1 and T2 to the same point; the output of the voltage comparator 10. The ground reference is effective when the output of the voltage comparator 10 is low and removed when it is high. This gives a voltage compensating effect such that any changes in the voltage of the battery 12 will be equally felt by the light sensing circuitry and the voltage comparator circuitry (the transistor T1 and the resistor R8). However, since the LED 22 tends to act as a constant voltage element, the current flow and thereby the voltage drop across the output transistor of the voltage comparator 10 change in a manner which is non-linear with respect to a corresponding change in the voltage across the battery 12 resulting in the problem enumerated above.

Figure 5:
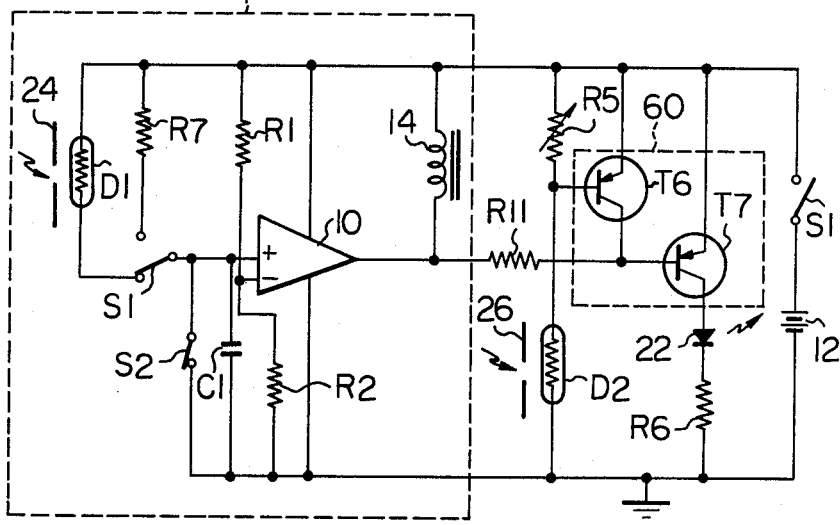
FIG. 5 is also similar to FIG. 3 but shows a third embodiment.
Figure 3:
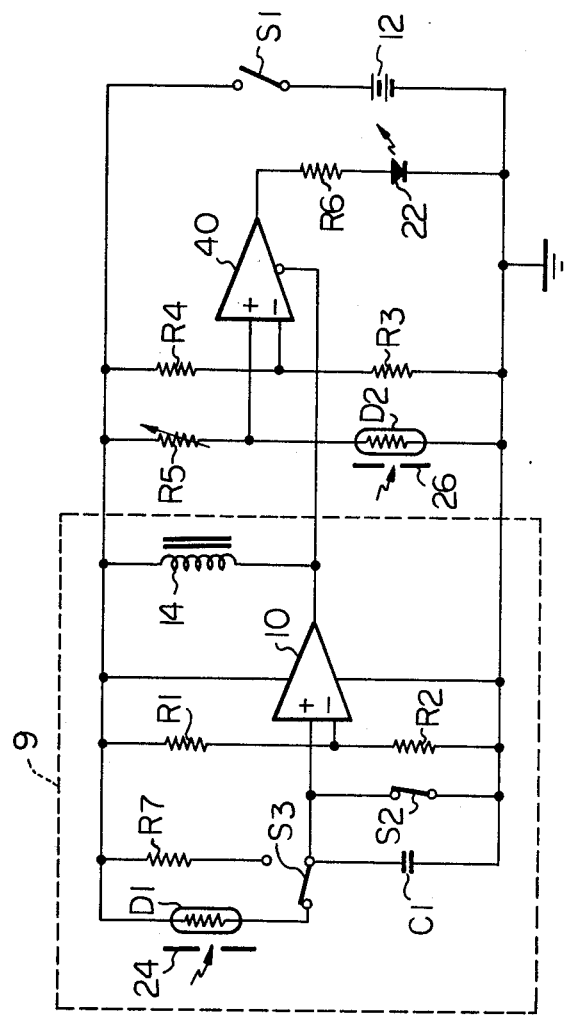
FIG. 3 shows a first embodiment of a shutter and low-light indicator actuating device according to the present invention.
Figure 4:
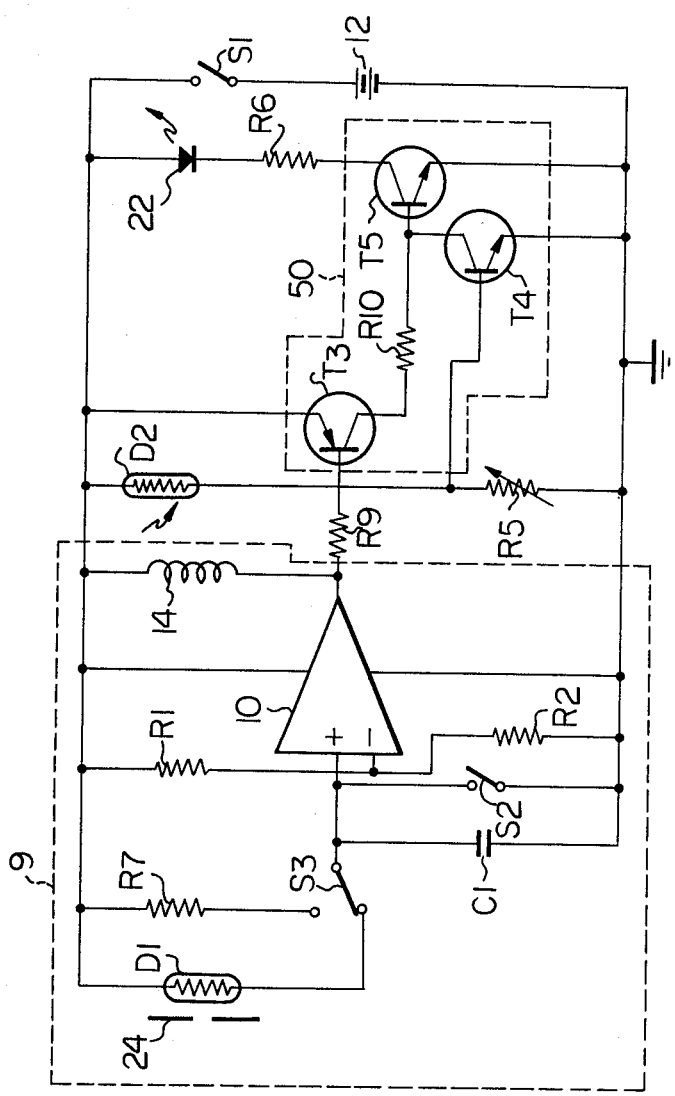
FIG. 4 is a similar to FIG. 3 but shows a second embodiment.

These problems are overcome in the embodiments of the present invention shown in FIG. 3, 4 and 5. Referring first to FIG. 3, the resistors R3 and R4 and the diode D2 and resistor R5 are reversed from their positions in the prior art embodiment of FIG. 1. Also the LED 22 is reversed and connected to the negative terminal of the battery 12.

In accordance with an important feature of the present invention, the diode D2 and resistor R5 are connected directly across the battery 12 in series with the switch S1 rather than the resistor R5 being connected to the output of the voltage comparator 10 as in the prior art. The output of the voltage comparator 10 is connected to an inverting strobe input of a voltage comparator 40.

When the second curtain is closed and the voltage comparator 10 produces a high output, this high output is applied to the inverting strobe input of the voltage comparator 40 so that the voltage comparator 40 will produce a low output regardless of the voltage at the non-inverting input thereof. This low voltage will not light the LED 22. However, when the second curtain is opened and the voltage comparator 10 produces a low output, the voltage comparator 40 is enabled. If the sensed light is above the low-light level, the resistance of the diode D2 will be low and the voltage at the non-inverting input of the voltage comparator 40 will be lower than the voltage at the inverting input thereof. The voltage comparator 40 will produce a low output which will not light the LED 22. However, if the sensed light level is low, the resistance of the diode D2 will be high and the voltage at the non-inverting input of the voltage comparator 40 will be higher than the voltage at the inverting input thereof. The voltage comparator 40 will thereby produce a high output which will light the LED 22.

It will be understood that since the series combination of the resistors R3 and R4 and the series combination of the diode D2 and resistor R5 are each connected across the battery 12, any variation in the battery 12 voltage will affect the voltage at the inverting and non-inverting inputs of the voltage comparator 40 equally, so that the light sensing function for the low-light indicator LED 22 is independent of the battery 12 voltage. Also, any change in battery 12 voltage affects the power supply of the voltage comparator 40 in the same manner. This is in contrast to the prior art in which the light sensing function changes in accordance with the voltage drop across the output transistor of the voltage comparator 10 which is caused by a number of factors, including the battery 12 voltage. Also, the LED 22 is electrically isolated from the diode D2, resistor R5 and voltage comparator 10 by the internal circuitry of the voltage comparator 40.

FIG. 4 shows another embodiment of the invention in which a voltage comparator 50 comprises discrete transistors. In this embodiment the output of the voltage comparator 10 is connected to the base of a transistor T3 through an input resistor R9. The transistor T3 serves the function of the inverting strobe input of the voltage comparator 40. The transistor T3 is of the PNP type with the emitter thereof connected to the switch S1. The collector of the transistor T3 is connected through a resistor R10 to the collector of an NPN transistor T4 and to the base of an NPN transistor T5. The base of the transistor T4 is connected to the junction of the diode D2 and resistor R5 and the emitter of the transistor T4 is connected to the negative terminal of the battery 12. The emitter of the transistor T5 is also connected to the negative terminal of the battery 12 and the collector of the transistor T5 is connected to the resistor R6.

When the output of the voltage comparator 10 is high, the transistor T3 is turned off thereby preventing any supply of base current to the transistor T5 and collector current to the transistor T4 through the transistor T3 and resistor R10. With no base current flow through the transistor T5, the same is turned off and no current can flow through the LED 22 to light the same. The transistor T5 serves as a current switching transistor for the LED 22 and is turned off whenever the second curtain is closed and the output of the voltage comparator 10 is high.

When the second curtain is opened and the output of the voltage comparator 10 becomes high, the transistor T3 is turned on and current flows through the transistor T3 and resistor R10. If the sensed light is above the low-light level, the voltage across the resistor R5 will be high enough to turn on the transistor T4, placing the collector thereof at substantially ground potential. In other words, all of the current flowing through the transistor T3 will also flow through the transistor T4 since, with the base of the transistor T5 at ground potential, no base current will flow therethrough. With the transistor T5 turned off, the LED 22 will not be lit. However, when the sensed light is below the low-light level, the voltage across the resistor R5 will be low enough to turn off the transistor T4. The current flow through the transistor T3 will also flow through the base of the transistor T5, turning the transistor T5 on and lighting the LED 22. It will be seen that the transistor T4 acts as a voltage comparator transistor.

FIG. 5 shows the third embodiment of the invention as comprising a voltage comparator 60 utilizing PNP transistors which allows the circuit to be embodied by one less transistor. The diode D2 and resistor R5 are again reversed, the junction thereof being connected to the base of a PNP transistor T6, the emitter of which is connected to the switch S1. The collector of the transistor T6 is connected to the base of a PNP transistor T7 and also to the output of the voltage comparator 10 through an input resistor R11. The emitter of the transistor T7 is connected to the switch S1 and the collector of the transistor T7 is connected to the negative terminal of the battery 12 through the LED 22 and resistor R6.

When the output of the voltage comparator 10 is high, the transistor T7 is turned off and no current can flow through the LED 22. When the output of the voltage comparator 10 is low, this low output is applied to the resistor R11. Where the sensed light is above the low-light level, the voltage at the base of the transistor T6 is low, thereby turning on the transistor T6. The base of the transistor T7 is in this manner effectively connected to the positive terminal of the battery 12 through the collector circuit of the transistor T6 so that the transistor T7 is turned off and the LED 22 will not light. However, when the sensed light is below the low-light level, the voltage at the base of the transistor T6 will be high turning off the transistor T6. The low voltage output of the voltage comparator 10 is in this case applied to the base of the transistor T7 turning the same on and passing current through the LED 22 to light the LED 22.

In summary, it will be seen that the present invention overcomes the problems of inaccurate low-light indication and wide variations in the intensity of a low-light indicator lamp with variations in battery voltage, temperature, humidity and other factors. The present circuitry is simple and economical and can be advantageously manufactured on a commercial production basis. Many modifications will become possible for those skilled in the art after receiving the teachings of the present disclosure without departing from the scope thereof.

What is claimed is:

1. A shutter and low-light indicator actuating device comprising:

a D.C. voltage source;

light sensitive shutter actuator means powered by the voltage source for producing an electric shutter opening signal for a length of time corresponding to the sensed light level;

light sensitive low-light sensor means connected directly across the voltage source for producing an electric signal analogous to the sensed level; and comparator means connected to the low-light sensor means and the shutter actuator means for producing an electric indicator activating signal only while the electrical signal produced by the low-light sensor means corresponds to a sensed light level below a predetermined value and the shutter opening signal is produced by the shutter actuator means;

the comparator means comprising an indicator current switching transistor, the shutter actuator means being connected to a base of the switching transistor, and a voltage comparator transistor, a base of the comparator transistor being connected to the low-light sensor means and a collector circuit of the comparator transistor being connected between the base of the switching transistor and the voltage source in such a manner that the comparator transistor is turned off while the electric signal produced by the low-light sensor means corresponds to a sensed light level below the predetermined value and turned on thereby connecting the base of the switching transistor to the voltage source with a polarity to turn off the switching transistor while the electric signal produced by the low-light sensor corresponds to a sensed light level above the predetermined value.

2. An actuating device as in claim 1, in which the comparator means has a signal input and a strobe input, the low-light sensor means being connected to the signal input and the shutter actuator means being connected to the strobe input.

3. An actuating device as in claim 1, in which the low-light sensor means comprises a light sensitive resistance element and a resistor connected in series across the voltage source, a junction of the resistance element and the resistor being connected to the comparator means.

4. An actuating device as in claim 1, further comprising a shutter actuated switch for actuating the shutter actuator means to produce the electric shutter opening signal.

* * * * *